(12) United States Patent
MacGregor

(10) Patent No.: US 7,019,247 B1
(45) Date of Patent: Mar. 28, 2006

(54) ELECTRICAL DISCHARGE MACHINE APPARATUS WITH PIEZO-ELECTRIC HEAD

(75) Inventor: John MacGregor, Ann Arbor, MI (US)

(73) Assignee: Ann Arbor Machine Company, Chelsea, MI (US)

( * ) Notice: Subject to any disclaimer, the term of this patent is extended or adjusted under 35 U.S.C. 154(b) by 0 days.

(21) Appl. No.: 11/062,381

(22) Filed: Feb. 22, 2005

(51) Int. Cl.
B23H 7/30 (2006.01)
B23H 7/10 (2006.01)

(52) U.S. Cl. ..................................... 219/69.2
(58) Field of Classification Search ............... 219/69.2, 219/69.12
See application file for complete search history.

(56) References Cited

U.S. PATENT DOCUMENTS 5,951,883 A 9/1999 Barbulescu 6,502,987 B1 * 1/2003 Kafai ........................ 384/12

FOREIGN PATENT DOCUMENTS

| JP | 5-146919 A | * | 6/1993 |
| JP | 6-297249 A | * | 10/1994 |
| JP | 10-156631 A | * | 6/1998 |
| JP | 2001-232521 A | * | 8/2001 |

* cited by examiner

Primary Examiner—Geoffrey S. Evans
(74) Attorney, Agent, or Firm—Brinks Hofer Gilson & Lione

(57) ABSTRACT

An electrical discharge machining head incorporating piezo-electric motors for controlling motion of a slide assembly. The slide assembly is translatable within a machine base and its motion is controlled by the piezo-electric motors. The slide assembly precisely controls the movement of an EDM electrode through the wire guide.

15 Claims, 4 Drawing Sheets

ELECTRICAL DISCHARGE MACHINE APPARATUS WITH PIEZO-ELECTRIC HEAD

FIELD OF THE INVENTION

This invention is related to a machining device and particularly to an electrical discharge machining (EDM) system.

BACKGROUND OF THE INVENTION

EDM is a well-known and widely used machining technique. It operates through the erosion of a workpiece, generally metallic, through electrical discharges from an electrode. The process takes place in the presence of a liquid dielectric fluid, such as de-ionized water. An electrode in the shape of an elongated rod, thin wire, or shaped article is put into close contact with the workpiece. Through an electrical potential difference, arcing occurs between the workpiece and the electrode which causes erosion of the workpiece material in a desired manner.

EDM processes are used in numerous machining applications. It is especially desirable for its high forming accuracy, the ability to machine extremely hard workpieces, its low applied loading of the workpiece, and its ability to form deep bores in workpieces.

During the EDM machining cycle, it is necessary to precisely position the end of the electrode with respect to the workpiece surface being machined as erosion of the workpiece occurs. Due to sacrificial material loss of the electrode, it is also necessary to incrementally advance the electrode tip with respect to the workpiece. Since EDM machining requires maintenance of a critical gap between the electrode and workpiece surface, the positioning of the electrode is provided by precision servo motor heads. A closed loop control system continuously monitors electrical parameters associated with the arc discharge and continuously controls the position of the head to move the electrode with respect to the workpiece.

Currently available EDM systems typically utilize a servo motor positioning head using a lead screw type actuator. A precision servo motor rotates the lead screw which causes the head position to be incrementally moved. The present systems have several significant limitations. There is typically a trade-off between the precision of positioning provided by a head and the speed at which it can be moved. The ability to quickly move the head into a machining position and withdrawing from it, while permitting highly accurate positioning is a desired attribute.

SUMMARY OF THE INVENTION

In accordance with the present invention, an EDM head is provided which utilizes a number of piezo-electric motors used to advance and retract the slide assembly of the head. The piezo-electric motors provide a high degree of positioning accuracy, yet also allows the head to be moved quickly into and out of machining positions. Through the implementation of an air bearing arrangement for the slide assembly, very low friction is provided which enables increased precision in head positioning.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
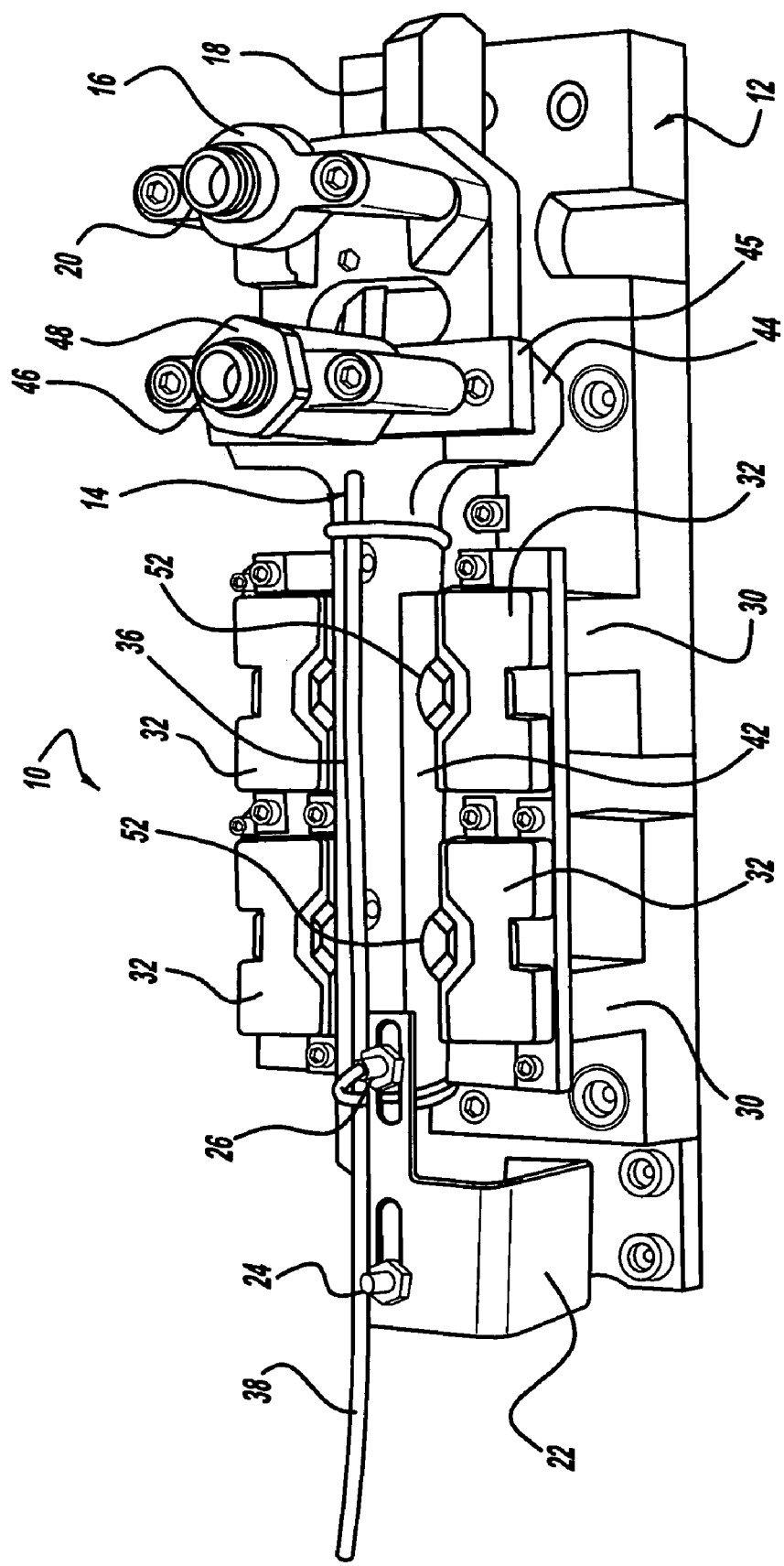
FIG. 1 is a pictorial view of the EDM head in accordance with this invention.
Figure 2:
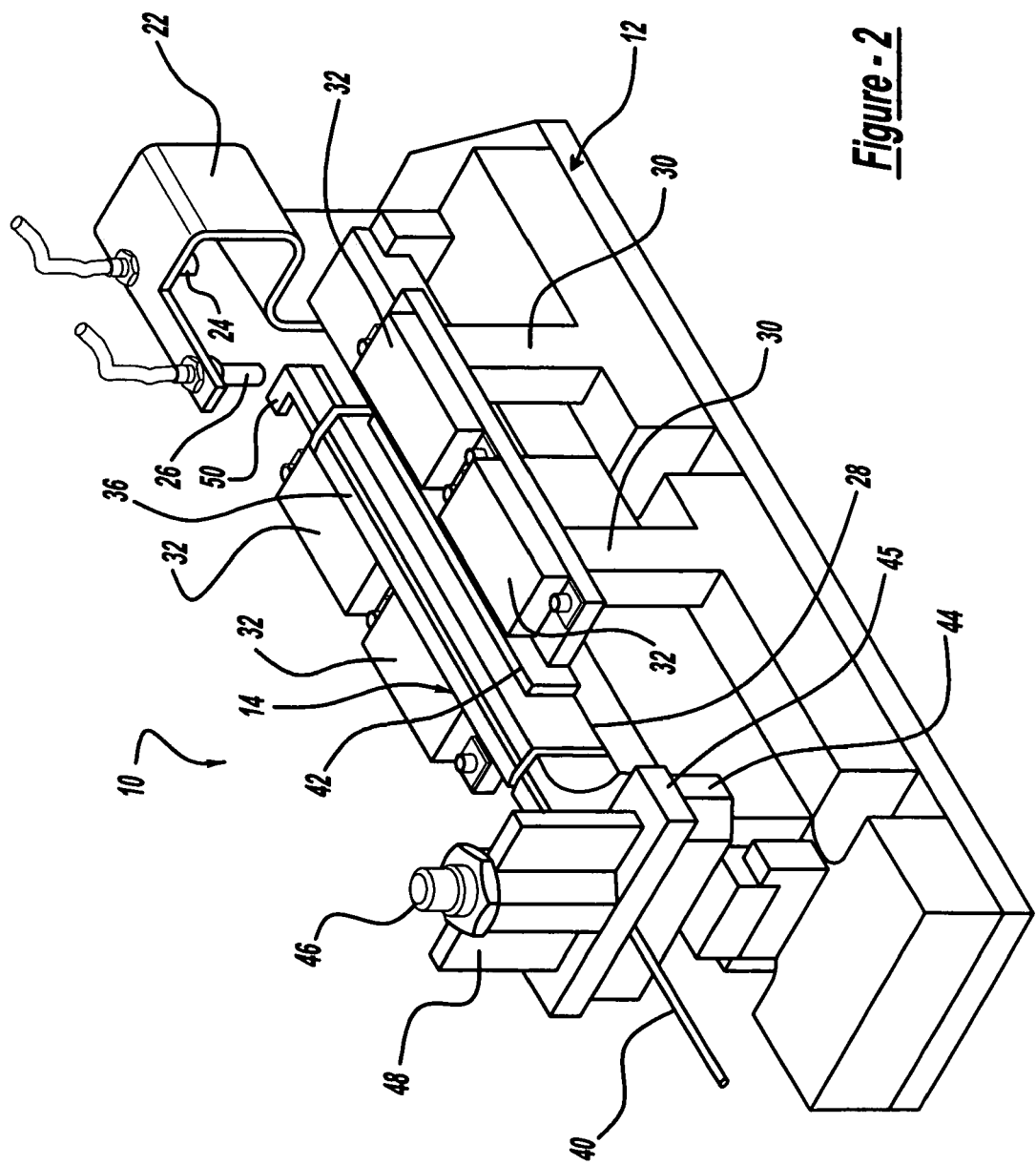
FIG. 2 is another pictorial view of the EDM head in accordance with this invention.
Figure 3:
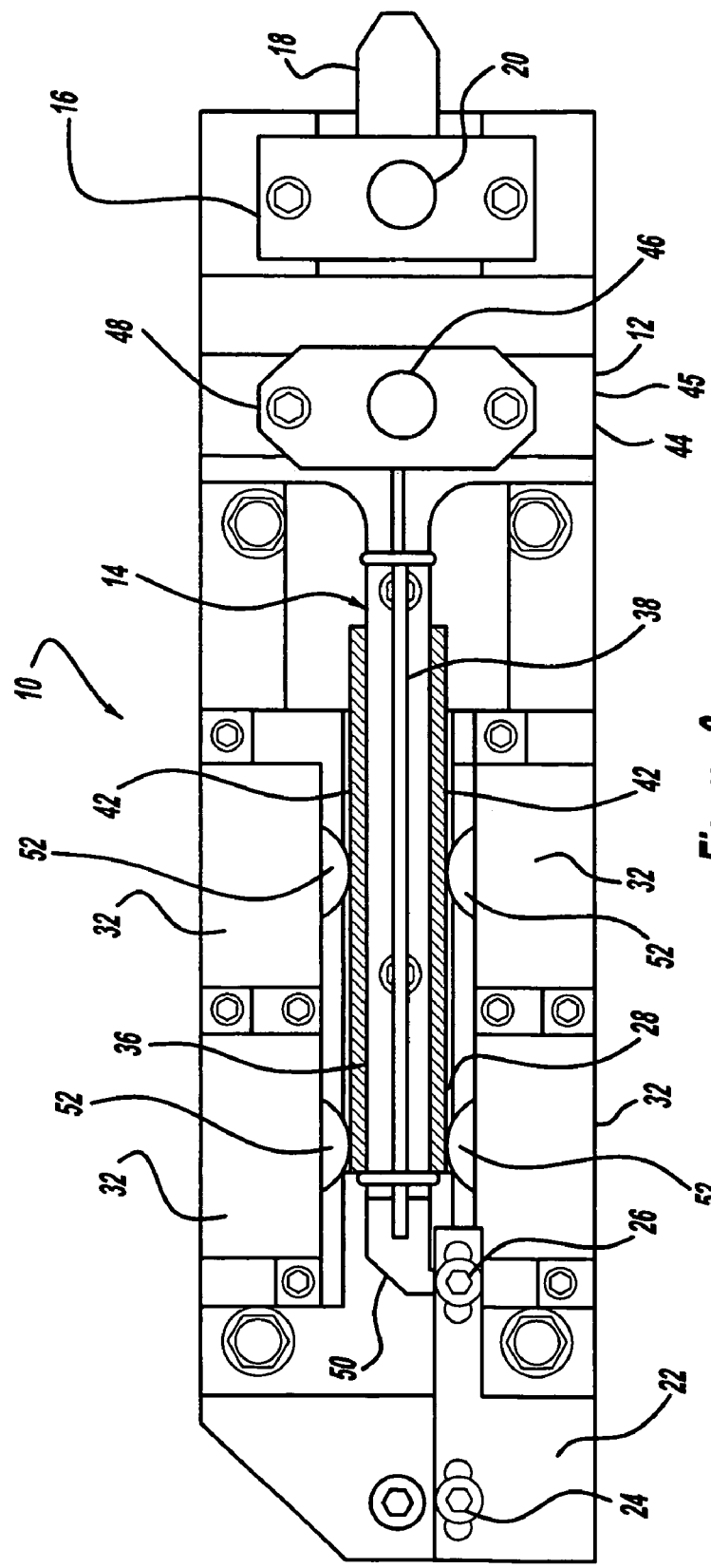
FIG. 3 is a top view of the EDM head.

With reference to the figures, EDM head is shown in a completely assembled condition in the figures and is generally designated by reference number 10. EDM head 10 principally comprises machine base 12 and slide assembly 14.

As shown in the figures, machine base 12 includes mounting bores for mounting the base to an associated EDM machining mounting structure. Fixed to machine base 12 at the forward end of the device, is wire guide clamp 16. Wire guide clamp 16 provides a mounting location for a wire guide 18 which may be, for example of the type described in U.S. Pat. No. 5,951,883 assigned to the Assignee of this application and which is hereby incorporated by reference. Wire guide clamp 16 is fixedly mounted with respect to machine base 12. Wire guide clamp 16 further incorporates air cylinder 20 which functions in a so-called "re-feed" cycle which will be detailed later in this description.

Figure 4:
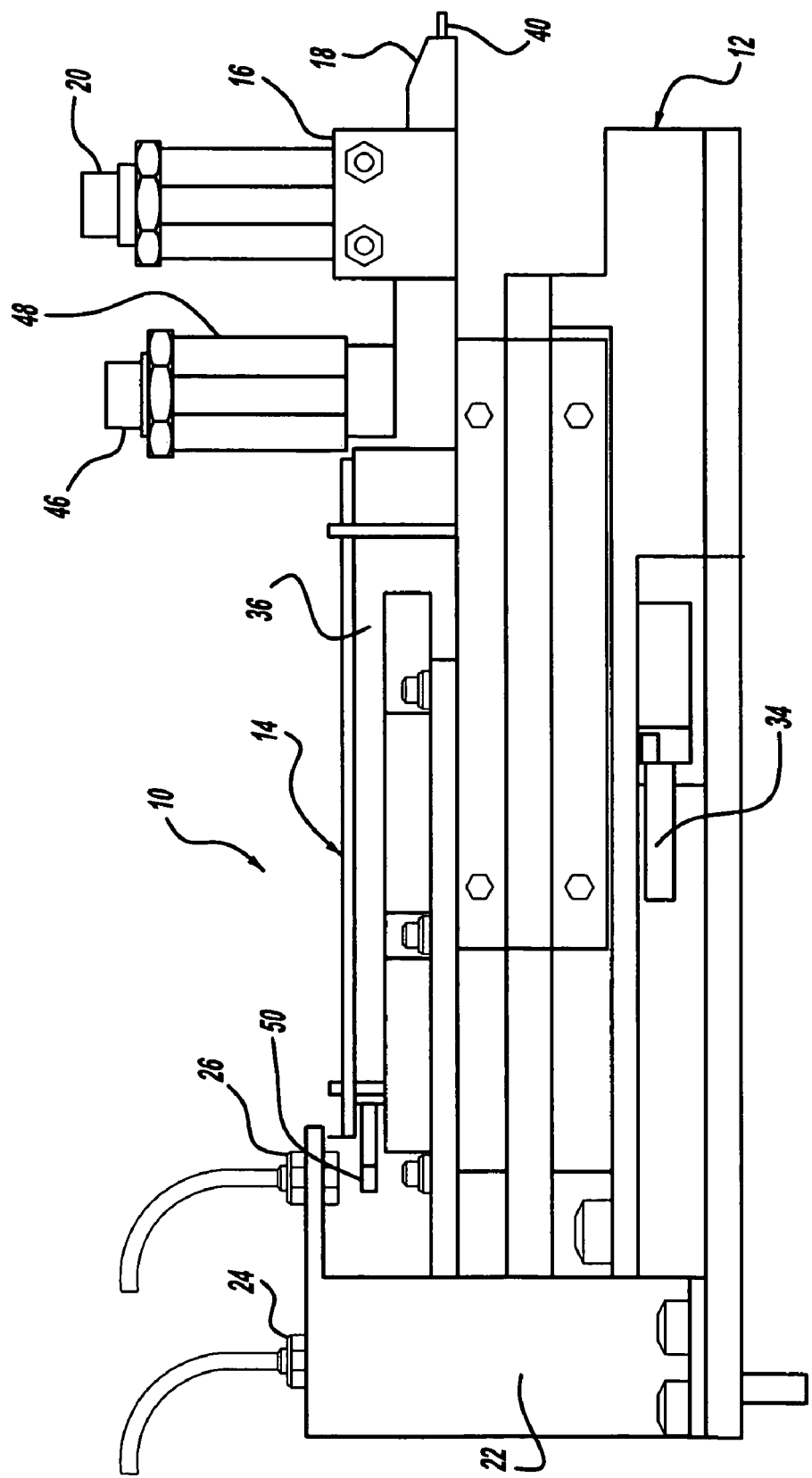
FIG. 4 is a side elevational view of the EDM head.

At the opposite end of machine base 12, switch bracket 22 is provided which provides a mounting location for a pair of photoelectric home switches 24 and 26. Switches 24 and 26 are used to indicate the position of slide assembly 14 which will be described in more detail in the following description. Machine base 12 further forms an elongated slide track 28 which allows for linear sliding motion of slide assembly 14. Two pairs of mounting posts 30 are provided for supporting piezo-electric motors 32. Displacement transducer 34, best shown in FIG. 4, is affixed to the lower surface of machine base 12 and is an optical device which precisely monitors linear motion of slide assembly 14 which features some type of ruling or index markings. Displacement transducer 34 may be of an optical "bar code" type which measures the motion of slide assembly 14 by changes in its electrical output as the ruling marks move past the transducer.

Machine base 12 further forms air flow openings within slide track 28 to provide slide assembly 14 with an air bearing support system. By directing pressurized air to the interface between machine base slide track 28 and slide assembly 14, motion of slide assembly 14 is accommodated with very low friction.

Slide assembly 14 includes slide rail 36 which closely conforms with and fits within mounting base slide track 28. Tube 38 is mounted to an upper surface of slide rail 36 for guiding an EDM electrode 40 into engagement with wire guide 18. A pair of friction strips 42 are provided on the opposing side surfaces of slide rail 36 and are provided to engage with piezo-electric motors 32. An end of slide rail 36 provides mounting head 44 for air cylinder 46 and electrode clamp 48. When electrode clamp 48 is engaged to clamp EDM electrode 40, reciprocating motion of slide assembly 14 causes the EDM electrode 40 to move into and out of wire guide 18. The end of slide rail 36 opposite mounting head 44 features an extending tab or shutter 50 which is provided to interact with photoelectric home switches 24 and 26 to define extended and retracted "home" positions for slide rail 36.

Various types of piezo-electric motors 32 may be employed in EDM head 10. One type manufactured by EDO Company (Model No. PDA-130) may be used in connection with this invention. These devices provide smooth, ultra-precision motion capabilities through the use of an associated controller which provides driving signals to piezo-electric motors 32. Their friction shoe 52 interacts with friction strips 42 to precisely position slide assembly 14 as desired. Applied electrical signals to piezo-electric motors 32 cause friction shoes 52 to move in an oscillating manner which causes slide assembly 14 to advance and retract as desired. Piezo-electric motors 32 incorporate internal ceramic crystals which, through the piezo-electric effect, contract and expand in response to an applied electric charge. Motors 32 further maintain the position of slide assembly 14 when they are not energized by an applied signal, enabling the system to remain in a stable condition between movement commands. While it may be possible to use fewer than the four piezo-electric motors 32 shown in connection with this invention, the use of four such devices is presently a preferred implementation.

In operation, an EDM electrode 40 is first fed through tube 38, electrode clamp 48 (with its air cylinder 46 retracted), and through wire guide 18 (with wire guide clamp 16 retracted). Electrode clamp 48 is actuated while wire guide clamp 16 remains retracted so that precision motion of slide assembly 14 causes the EDM electrode 40 to be precisely moved through wire guide 18. This would be undertaken during an EDM machining operation. Machine base 12 is mounted to a translation stage (not shown) which brings EDM head 10 into position with respect to a workpiece and retracts it following completion of the EDM operation. Accordingly, during machining, an appropriate closed loop control sub-system is used to precisely control the motion of slide assembly 14 and therefore the tip of EDM electrode 40 with respect to the workpiece during a machining operation.

Since EDM electrode 40 is partially consumed during EDM operation, it is periodically necessary to advance a length of EDM electrode 40 with respect to slide assembly 14. When it is desired to "re-feed" EDM electrode 40, wire guide clamp 16 is activated to clamp against wire guide 18. Simultaneously, electrode clamp 48 disengages the electrode by retracting air cylinder 46. Following retraction of slide assembly 14, wire guide clamp 16 is retracted and air cylinder 46 is activated to frictionally engage EDM electrode 40 through electrode clamp 48, thus permitting continued EDM operation.

While the above description constitutes the preferred embodiment of the present invention, it will be appreciated that the invention is susceptible to modification, variation and change without departing from the proper scope and fair meaning of the accompanying claims.

What is claimed is:

1. An electrical discharge machining system head for machining a workpiece using a wire electrode comprising:
    a machine base forming a slide track;
    a slide assembly positioned within the slide track and linearly moveable along the slide track, the wire electrode supported by the slide assembly and positioned relative to the workpiece through linear sliding motion of the slide assembly; and
    at least a first piezoelectric motor mounted to the machine base and engaging the slide assembly along a first side surface and at least a second piezoelectric motor mounted to the machine base and engaging the slide assembly along a second side surface and controlling the linear position of the slide assembly relative to the machine base.

2. An electrical discharge machining system head according to claim 1 further comprising the assembly having four of the piezoelectric motors with a first pair of the motors mounted on the machine base engaging a first side surface of the slide assembly and a second pair of the motors engaging a second side surface of the slide assembly.

3. An electrical discharge machining system head according to claim 1 further comprising the slide track and the slide assembly forming an air bearing surface for reducing friction of sliding motion of the slide assembly relative to the machine base.

4. An electrical discharge machining system head according to claim 1 further comprising the slide assembly having a mounting head for selectively clamping against the wire electrode to cause the wire electrode to move with the slide assembly and unclamping against the wire electrode to allow the wire electrode to move relative to the slide assembly.

5. An electrical discharge machining system head according to claim 4 further comprising a first air cylinder for controlling the clamping and unclamping of the mounting head.

6. An electrical discharge machining system head according to claim 1 further comprising the machine base having a wire electrode guide for engaging and supporting the wire electrode wherein sliding movement of the slide assembly causes the wire electrode to be fed through the wire electrode guide.

7. An electrical discharge machining system head according to claim 6 further comprising a wire electrode guide clamp for selectively causing the wire electrode guide to clamp or unclamp the wire electrode.

8. An electrical discharge machining system head according to claim 7 further comprising a second air cylinder for controlling the clamping and unclamping of the wire electrode guide clamp.

9. An electrical discharge machining system head for machining a workpiece comprising:
    a machine base forming a slide track, the machine base having a wire electrode guide for engaging and supporting the wire electrode;
    a slide assembly positioned within the slide track and linearly moveable along the slide track, the slide assembly having a mounting head for clamping against the wire electrode to cause the wire electrode to move with the slide assembly, wherein linear sliding movement of the slide assembly along the slide track causes the wire electrode to be fed through the wire electrode guide; and
    at least a first piezoelectric motor mounted to the machine base and engaging the slide assembly along a first side surface and least a second piezoelectric motor mounted to the machine base and engaging the slide assembly along a second side surface and controlling the position of the slide assembly relative to the base.

10. An electrical discharge machining system head according to claim 9 further comprising the assembly having four of the piezoelectric motors with the first motor is one of a first pair of the motors mounted on the machine base engaging a first side surface of the slide assembly and the second motor is one of a second pair of the motors engaging a second side surface of the slide assembly.

11. An electrical discharge machining system head according to claim 9 further comprising the slide track and the slide assembly forming an air bearing surface for reducing friction of sliding motion of the slide assembly relative to the machine base.

12. An electrical discharge machining system head according to claim 9 further comprising the slide assembly mounting head selectively clamping against the wire electrode to cause the wire electrode to move with the slide assembly and unclamping against the wire electrode to allow the wire electrode to move relative to the slide assembly.

13. An electrical discharge machining system head according to claim 12 further comprising a first air cylinder for controlling the clamping and unclamping of the mounting head.

14. An electrical discharge machining system head according to claim 9 further comprising a wire electrode guide clamp for selectively causing the wire electrode guide to clamp or unclamp the wire electrode.

15. An electrical discharge machining system head according to claim 14 further comprising a second air cylinder for controlling the clamping and unclamping of the wire electrode guide clamp.

* * * * *